US006367695B1

(12) United States Patent
Mair et al.

(10) Patent No.: US 6,367,695 B1

(45) Date of Patent: Apr. 9, 2002

(54) SELF SERVICE TERMINAL

(75) Inventors: John Mair, Perth; Gordon D. Sharp; Douglas F. Russell, both of Dundee, all of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/541,344

(22) Filed: Apr. 3, 2000

(30) Foreign Application Priority Data

Apr. 6, 1999 (GB) .............................................. 9907639

(51) Int. Cl.[7] .............................................. G06K 5/00

(52) U.S. Cl. ...................... 235/380; 235/379; 235/381; 235/382; 902/30; 902/31

(58) Field of Search ................................ 235/379, 380, 235/382, 381; 902/30, 31

(56) References Cited

U.S. PATENT DOCUMENTS

| | | | | | |
|---|---|---|---|---|---|
| 5,243,326 | A | * | 9/1993 | Disabato | 340/555 |
| 5,410,295 | A | * | 4/1995 | Van Lint | 340/568 |
| 5,454,332 | A | * | 10/1995 | Fennelly et al. | 109/19 |
| 5,515,045 | A | * | 5/1996 | Tak | 341/23 |
| 5,726,430 | A | * | 3/1998 | Ruggirello | 235/379 |
| 5,984,178 | A | * | 11/1999 | Gill et al. | 235/379 |
| 6,056,087 | A | * | 5/2000 | Addy et al. | 235/383 |

FOREIGN PATENT DOCUMENTS

| | | | |
|---|---|---|---|
| EP | 0411185 | | 2/1991 |
| EP | 0809171 | | 11/1997 |
| EP | 0836161 | | 4/1998 |
| GB | 0 788 083 | * | 6/1997 |
| WO | 9827518 | | 6/1998 |

* cited by examiner

*Primary Examiner*—Michael G. Lee
*Assistant Examiner*—Seung H Lee
(74) *Attorney, Agent, or Firm*—Peter H. Priest

(57) ABSTRACT

A self-service terminal (SST) comprises: a data capture device (16); an emitter (34); a detector (40); and an arrangement (44,48) for producing an alarm signal if the detector (40) fails to receive emissions from the emitter (34). The data capture device (16), the emitter (34) and the detector (40) are arranged such that an object (21) in the vicinity of the data capture device (16) will obstruct the path of emissions from the emitter (34) to the detector (40).

19 Claims, 3 Drawing Sheets

SELF SERVICE TERMINAL

BACKGROUND OF THE INVENTION

The present invention relates primarily to self-service terminals (SSTs), such as automatic teller machines (ATMs); and in particular to an SST incorporating a fraud prevention arrangement. Other aspects of the invention relate to the prevention and detection of unauthorized interference or tampering with data capture devices.

SSTs, such as automated teller machines (ATMs), are commonly and increasingly used to carry out many everyday transactions which do not require human supervision. In the case of ATMs, one of the most frequently executed transactions is the withdrawal of cash from a bank account, although other transactions may involve electronic transfer of funds between accounts, bill payments, or simply obtaining an indication of an account balance or a "mini-statement" providing details of recent transactions.

To make use of a conventional ATM, a user is first required to insert a magnetic strip card into a card reader slot in the ATM fascia, the card serving as an identification token; by presenting the card the user is claiming a particular identity. The user must then confirm their identity by, for example, entering a personal identification number (PIN) associated with the card, but known only to the user. The PIN is entered on a keypad incorporated in the ATM.

Alternative or additional means of identity confirmation may also be used; for example, a user may place their palm or finger on an electronic scanner, allowing a comparison between the palm or fingerprint and a stored sample of the user's print. Similarly, a camera or scanner associated with an appropriate processor may be employed to compare a user's iris pattern or other biometric identifier with a stored template.

Thus, if an unauthorized user wishes to gain access to an individual's account and thus make unauthorized withdrawals of funds, it is necessary to both obtain the individual's card, and gain knowledge of the appropriate PIN or other means used to confirm the user's identity.

While obtaining a card from a user without their knowledge may be relatively straightforward for a pickpocket, a number of elaborate techniques have been used in order to gain knowledge of an individual's PIN. One such technique involves placing a false keypad overlay above the ATM keypad, which false keypad is connected to a recorder. When a user enters their PIN, the false keypad transmits the pressure of keypresses to the ATM keypad below, so that the user suspects nothing is wrong, but also inputs their PIN into the false keypad. In other less sophisticated arrangements a false keypad may be employed which is unable to transfer pressure to the ATM keypad, such that the user will not be able to use the ATM; users will "enter" their PIN on the false keypad, but the ATM will not respond and will eventually reject the user's card. However, this form of false keypad is more likely to be detected as users may become suspicious and examine the ATM more closely and identify the false keypad, or may report the "fault" immediately to the ATM operator.

Once the user's PIN has been entered in the false keypad and the user has left the ATM, the keypad may be removed from the ATM and the PIN retrieved. The unauthorized user may then purloin the user's card, and combine this with the PIN to carry out unauthorized transactions. A somewhat similar technique may be used with biometric sensors such as finger or palmprint readers: a false scanner is overlaid on the genuine scanner, and may record the features of the user's fingerprint or palmprint. The recorded features may then be reproduced and the reproduction used to "fool" the scanner into believing the authorized user is present.

SUMMARY OF THE INVENTION

It is among the objects of embodiments of the present invention to provide an SST which reduces the risks of such frauds occurring. It is further among the objects of embodiments of the present invention to provide an SST which alerts the SST operator to unauthorized interference with an SST.

According to a first aspect of the present invention, there is provided a self-service terminal (SST) comprising: a data capture device; an emitter; a detector; and means for producing an alarm signal if the detector fails to receive emissions from the emitter, wherein the data capture device, the emitter and the detector are arranged such that an object in the vicinity of the data capture device will obstruct the path of emissions from the emitter to the detector.

In other aspects of the present invention a system may be provided for incorporation in an existing SST.

The data capture device may be a keypad, fingerprint scanner, iris scanner or the like. In such an SST if, for example, a false keypad is placed above the SST keypad, the false keypad will interrupt the path of emissions between the emitter and the detector, and the presence of the false keypad will be detected.

Preferably, the emitter and the detector utilize electromagnetic radiation; and most preferably infra-red radiation. Infra-red radiation is invisible to humans, and the presence of such a monitoring system would not be apparent to users. Additional or alternative emitter-detector systems may also be used employing, for example, radio waves, microwaves, ultraviolet radiation, or non-electromagnetic radiation systems such as ultrasound. It may be convenient to combine two or more different systems in a single SST, such that if a malfeasor should be aware of one system, and take measures to ensure that, for example, infra-red radiation is not blocked by a false keypad, ultraviolet radiation may still be blocked, and thus the false keypad will be detected nonetheless.

Preferably, at least a portion of the data capture device is transparent to the emissions from the emitter. This enables, for example, the emitter to be concealed beneath a keypad, with the detector above; or vice versa. Alternatively, the data capture device may be recessed in the fascia of the SST, and the emitter and the detector mounted on opposite sides of the recess above the data capture device.

Conveniently, the transparent portion of the data capture device comprises at least one window in a surface of the data capture device, and most preferably a plurality of windows. These windows may be in the keys of a keypad, or the palm area of a palm scanner and ensure that a false overlay will obscure at least one window if the false overlay is to capture the necessary data.

Conveniently, the emitter is mounted directly beneath the data capture device, and the detector is mounted above the data capture device. Alternatively, the inverse arrangement may be used.

Preferably, the emitter emits an encoded series of pulses or another form of encoded or encrypted signal; use of an encoded signal will make it more difficult to imitate the emitted signal. The code utilized may be varied over time, or may be determined by the nature of the previous transaction, or some other condition. This added complexity will reduce the likelihood of an unauthorized individual determining the nature of the code and making use of that knowledge to evade the detection system.

Preferably, the means for producing an alarm signal only produces an alarm signal if the detector fails to receive emissions from the emitter for a predetermined interval; in the normal course of use the SST, there will be obstructions placed in the pathway from emitter to detector as, for example, a user's hand actuates the data capture device. The interval may be selected to accommodate interruptions to the detection of emissions as would be expected to occur during the normal use of the SST. However, longer continuous interruptions, as would occur if an attempt was made to cover the data capture device with a false device, will result in production of an alarm signal.

The means for producing an alarm signal may take any appropriate form, for example a comparator for comparing signals output by the emitter with signals received by the detector, or a simple switch which is tripped when there is no signal input to the detector.

Preferably, the SST is provided in conjunction with an alarm, most preferably the alarm being remote from the SST, whereby on detection of an obstruction near the data capture device an authorized person may be alerted. The SST may shut down when an alarm signal is produced, to prevent use of the terminal while a risk of fraudulent activity exists. Alternatively, or in addition, the SST may be programmed or otherwise arranged to initiate other action, for example a camera on the SST may be activated to record the scene and assist in identifying the person who has placed the false overlay on the data capture device, or the camera may allow an authorized person to view the terminal fascia from a remote location and determine if immediate action is required. For example, the operator may determine that the alarm signal has been generated due to a situation which is not a threat to security, for example a user's purse, a food-wrapper or another item being left on an ATM keypad.

According to a further aspect of the present invention, there is provided a method of detecting an attempted fraud in a self-service terminal (SST), the method comprising the steps: providing an emitter and a detector disposed with respect to a data capture device of an SST; monitoring receipt of emissions from the emitter by the detector to permit detection of objects placed in the vicinity of the data capture device and obstructing the path of emissions from the emitter to the detector.

According to another aspect of the present invention, there is provided a self-service terminal (SST) comprising: a data capture device; means for detecting the presence of an object in the vicinity of the data capture device; and means for producing an alarm signal on detection of such an object.

According to a still further aspect of the present invention, there is provided a self-service terminal (SST) comprising: a data capture device; an emitter; a detector; an alarm which is activated if the detector fails to receive emissions from the emitter, the data capture device, the emitter and the detector being arranged such that an object in the vicinity of the data capture device will obstruct the path of emissions from the emitter to the detector.

According to another aspect of the present invention, there is provided an arrangement comprising: a data capture device; means for detecting the presence of an object in the vicinity of the data capture device; and means for producing an alarm signal on detection of such an object.

According to yet another aspect of the present invention there is provided an arrangement comprising: a capture device; means for detecting the presence of an object in the vicinity of the capture device; and means for activating an alarm signal on detection of such an object.

In this aspect of the invention, the capture device may be a data capture device or a token capture device for capturing an identification token, such as a magnetic stripe card or a Smart card.

BRIEF DESCRIPTION OF THE DRAWINGS

These and other aspects of the present invention will now be described, by way of example only, with reference to the accompanying drawings, in which.

DETAILED DESCRIPTION

Figure 1:
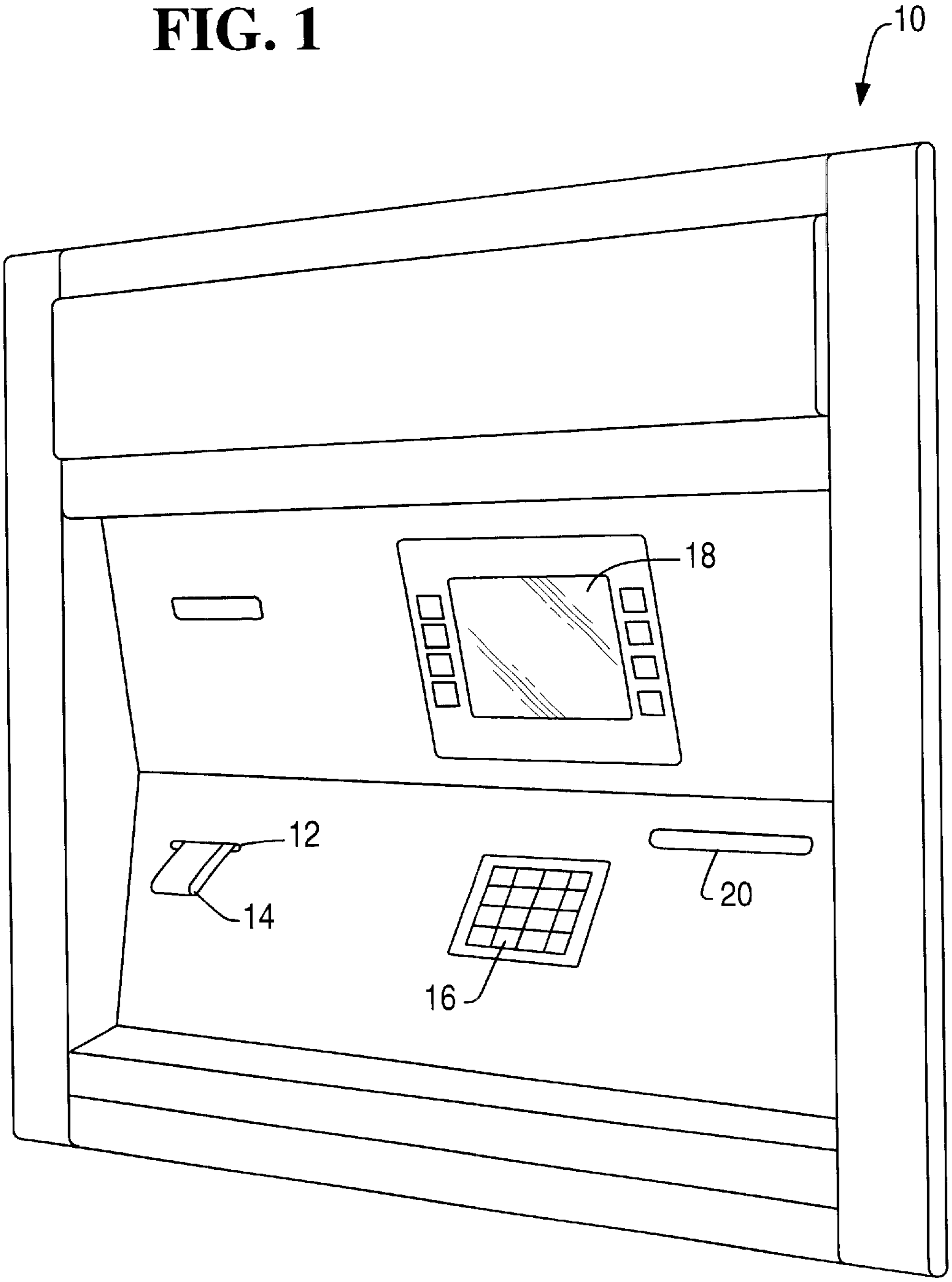
FIG. 1 shows a perspective view of the fascia of a conventional automatic teller machine (ATM)

Referring first to FIG. 1, this shows the fascia of a conventional automatic teller machine (ATM). The ATM 10 comprises a number of elements for interaction with a user, including a magnetic card reader slot 12, where the user inserts an identification card 14; a data collection device in the form of a keypad 16, where the user may enter their PIN or other data; a screen 18, on which the ATM displays messages for the user; and a cash dispensing slot 20, from which the user may collect bank notes or other valuable media.

If an attempted fraud as described above is to be perpetrated, a false keypad 21 (FIG. 2) is placed over the keypad 16, and connected to a monitoring device (not shown). When a user inserts their card 14 in the slot 12, the ATM 10 displays a message on the screen 18, prompting the user to enter their PIN on the keypad 16. The user then enters their PIN, via the false keypad 21; the keypad 21 records the PIN. After the transaction has been completed, an unauthorized individual may download the PIN from the false keypad 21. If an accomplice successfully picks the user's pocket and obtains possession of their card 14, the PIN may then be used to withdraw funds from the user's bank account.

Figure 2:
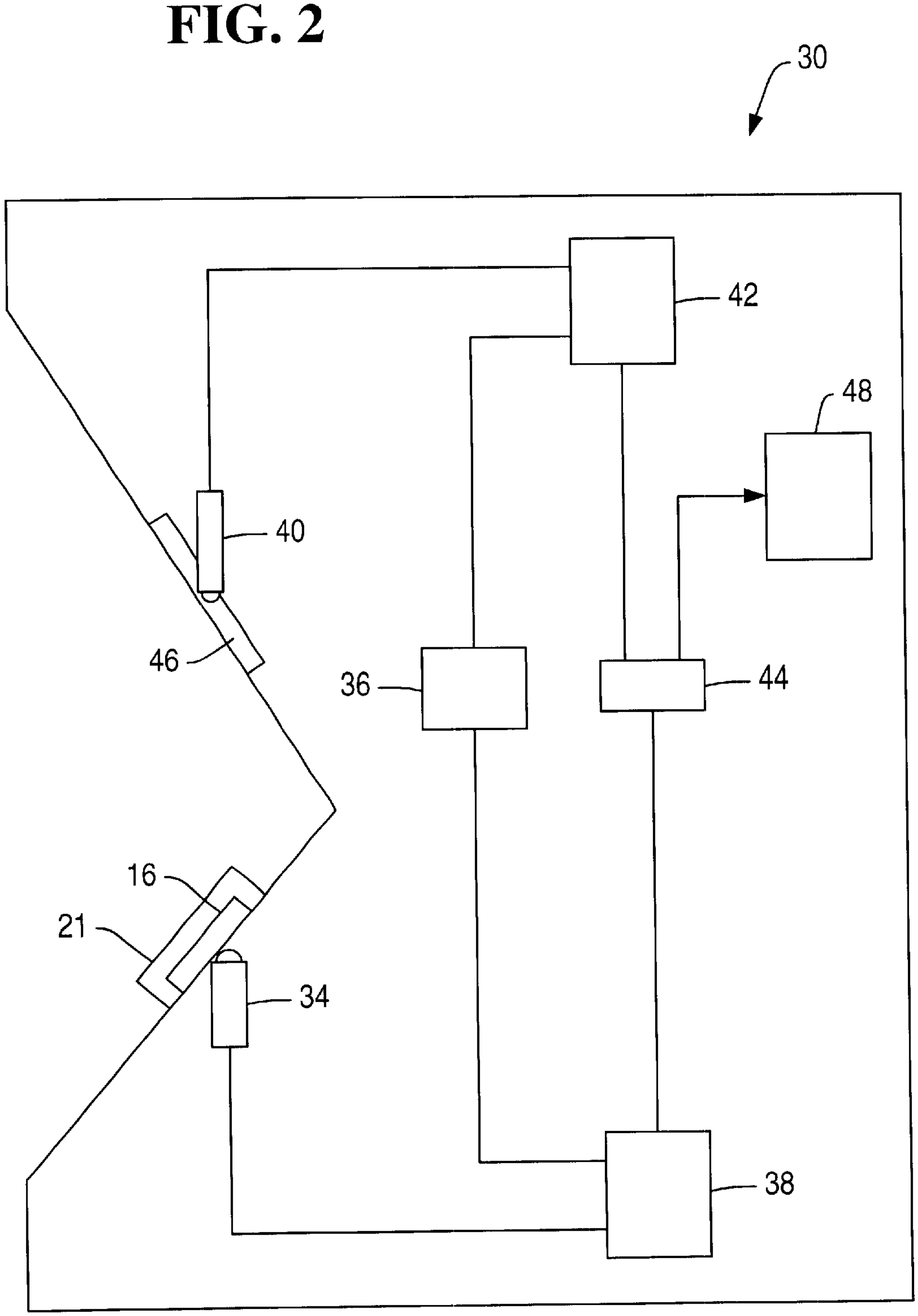
FIG. 2 shows a schematic cross-section of a fascia of an ATM including a fraud detection arrangement according to a first embodiment of the present invention.

FIG. 2 shows a schematic cross-section of a fascia of an ATM 30, including an arrangement in accordance with an embodiment of the present invention whereby such attempted frauds may be detected. Located beneath the keypad 16 is an infra-red emitter 34, connected to a power source 36 and an encoder 38. Located vertically above the emitter 34 in the ATM fascia is an infra-red detector 40, connected to the power source 36 and a decoder 42. Both the encoder 38 and decoder 42 are linked to a comparator 44. In this example the emitter 34 is positioned beneath the keypad 16, portions of which are infra-red transparent, such that the emitter 34 is concealed. The detector 40 is concealed behind an infra-red transparent monitor screen 46.

Coded signals are emitted by the emitter 34 at timed intervals, which signals pass through the keypad 16 to the detector 40. The detected signals are passed to the decoder 42 which communicates with the comparator 44 to confirm that the detected signals correspond to those emitted by the emitter 34.

If a false keypad 21 is placed over the ATM keypad 16, the signals from the emitter 34 are interrupted and do not reach the detector 40. This condition causes the comparator 44 to issue an alarm signal to activate an alarm circuit 48 and thus alert the ATM operator, and de-activate the ATM.

To accommodate normal usage of the ATM 30, the comparator 44 incorporates a time delay which prevents the issue of an alarm signal until the detector 40 has not received signals from the emitter 34 for a predetermined interval. The interval is selected such that use of the keypad 16 by a user, which will result in interruption of the signals reaching the detector 40, will not result in issue of spurious alarm signals.

It will be apparent to those of skill in the art that the embodiment of the invention as described above serves to prevent attempted frauds utilizing false keyboards to obtain users' PINs.

Figure 3:
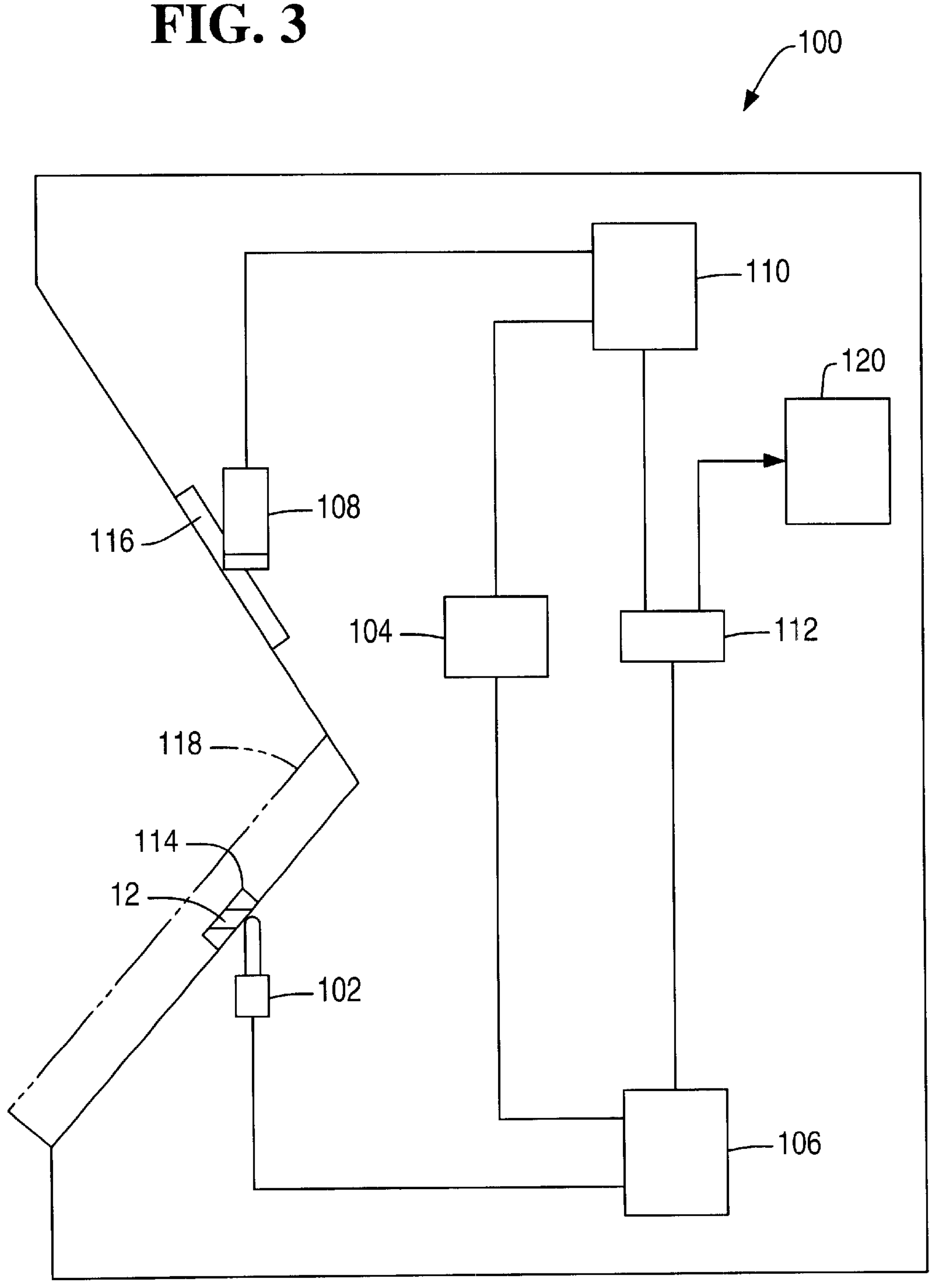
FIG. 3 shows a schematic cross-section of a fascia of an ATM including a fraud detection arrangement according to a second embodiment of the present invention.

FIG. 3 shows a schematic cross-section of a fascia of an ATM 100, including an arrangement in accordance with a second embodiment of the present invention whereby attempted fraud by overlaying a card reader may be detected. Located behind the card reader slot 12 is an infra-red detector 102, connected to a power source 104 and an encoder 106. Located vertically above the detector 102 in the ATM fascia is an infra-red emitter 108, connected to the power source 104 and a decoder 110. Both the encoder 106 and decoder 110 are linked to a comparator 112. In this example the detector 102 is positioned at the top edge of slot 12 behind a fascia portion 114 which is transparent to infra-red radiation, but not transparent to visible light, such that the detector 102 is concealed from a user's view by portion 114. The emitter 108 is concealed behind an infra-red transparent monitor screen 116 and emits infra-red radiation over a wide angle.

Coded signals are emitted by the emitter 108 at timed intervals, which signals pass through portion 114 to the detector 102. The detected signals are passed to the decoder 106 which communicates with the comparator 112 to confirm that the detected signals correspond to those emitted by the emitter 108.

If a false sheet 118 (shown in FIG. 3 by a broken line) having a false card reader slot is placed over the lower part of the ATM, the signals from the emitter 108 are interrupted and do not reach the detector 102. This condition causes the comparator 112 to issue an alarm signal to activate an alarm circuit 120 and thus alert the ATM operator, and de-activate the ATM.

To accommodate normal usage of the ATM 100, the comparator 112 incorporates a time delay which prevents the issue of an alarm signal until the detector 108 has not received signals from the emitter 102 for a predetermined time interval. The interval is selected such that use of the card reader slot 12 by a user, which will result in interruption of the signals reaching the detector 108, will not result in issue of spurious alarm signals.

It will be apparent that various modifications and improvements may be made to the arrangements described above without departing from the scope of the invention. For example, any suitable form of signal may be used to detect the presence of an unauthorized keyboard or the like, in addition to or as an alternative to infra-red emissions. Further, the relative location of the emitter and detector may be varied; or a signal may be passed across the surface of a keypad, rather than through the keypad. In other embodiments, the detector may be configured to detect reflections of signals emitted from the emitter, so that an object placed in the vicinity of the data capture device reflects a signal emitted from the emitter into the detector. In such an embodiment, an alarm may be activated if a reflected signal is detected for longer than a predetermined time period. Other embodiments of the invention may have a single emitter and multiple detectors, so that detectors may be located in the keypad, card reader slot, cash dispenser slot, and such like locations.

Other embodiments of the invention may be provided for use in conjunction with data capture devices other than those provided in combination with SSTs, for example combination entry keypads or palmprint scanners which are utilized to release locks to gain access to secure areas.

What is claimed is:

1. A self-service terminal (SST) comprising:

a data capture device for receiving identifying data from a customer;

an emitter for producing emissions directed toward the data capture device;

a detector for receiving emissions directed from the emitter toward the data capture device, the detector being positioned and oriented so as to fail to detect the emissions directed from the emitter if the data capture device is at least partially covered by an object when the object is positioned in such a way as to intercept data intended for the data capture device; and an alarm signal generator for producing an alarm signal, the alarm signal generator being activated by the detector if the detector fails to receive emissions from the emitter.

2. An SST according to claim 1, wherein the data capture device comprises a keypad.

3. An SST according to claim 1, wherein the emitter produces electromagnetic radiation and the detector detects the electromagnetic radiation produced by the emitter.

4. An SST according to claim 1, wherein the emitter produces infra-red radiation and the detector detects the infra-red radiation produced by the emitter.

5. An SST according to claim 1, wherein at least a portion of the data capture device is transparent to the emitter and the emitter and the detector are arranged on opposite sides of the data capture device such that the emissions from the emitter pass through the transparent portion of the data capture device to strike the detector.

6. An SST according to claim 1, wherein the emitter emits an encoded signal.

7. An SST according to claim 1, wherein the detector activates the alarm signal generator if the detector fails to receive emissions from the emitter for a predetermined interval.

8. An SST according to claim 1, further comprising an alarm which is activated in response to the alarm signal.

9. A self-service terminal (SST) comprising:

a data capture device for receiving identifying information from a user;

means for detecting an object at least partially covering the data capture device in such a way as to intercept data intended for the data capture device; and means for producing an alarm signal when an object at least partially covering the data capture device in such a way as to intercept data intended for the data capture device is detected.

10. An SST according to claim 9, wherein the data capture device comprises a keypad.

11. An SST according to claim 9, wherein the detecting means operates using electromagnetic radiation.

12. An SST according to claim 11, wherein the detecting means operates using infra-red radiation.

13. An SST according to claim 11, further comprising an alarm which activates in response to an alarm signal which is produced when an object is detected at least partially covering the data capture device in such a way as to intercept data intended for the data capture device.

14. A method of detecting an attempted fraud in a self-service terminal having a data capture device for receiving identifying data from a customer, the method comprising the steps of:

monitoring emissions along a path from an emitter directing emissions toward the data capture device to a detector placed near the data capture device such that the an object at least partially covering the data capture device in such a way as to intercept data intended for the data capture device will prevent the emissions from reaching the data capture device; and producing a signal indicative of an attempted fraud when an object at least partially covers the data capture device in such a way as to intercept data intended for the data capture device and obstructs the path of emissions from the emitter to the detector.

15. A method according to claim 14, comprising the step of:

activating an alarm in response to the signal indicative of an attempted fraud.

16. A method of operating a self-service terminal having a data capture device for receiving identifying data from a customer, the method comprising the steps of:

monitoring signals along a path directed toward the data capture device; and producing an alarm signal indicative of an attempted fraud at the self-service terminal when an object is placed so as to at least partially cover the data capture device in such a way as to intercept data intended for the data capture device and the object obstructs signals along the path.

17. A method according to claim 16, further comprising the step of:

activating an alarm in response to an alarm signal which is produced when an object is placed in the vicinity of the data capture device and obstructs signals along the path.

18. A method of operating a self-service terminal having a data capture device for receiving identifying information from a customer, the method comprising the steps of:

detecting an object at least partially covering the data capture device in such a way as to intercept data intended for the data capture device; and producing an alarm signal when an object is detected at least partially covering the data capture device in such a way as to intercept data intended for the data capture device.

19. A method according to claim 18, further comprising the step of:

activating an alarm in response to an alarm signal which is produced when presence of an object is detected in the vicinity of the data capture device.

* * * * *